Jan. 25, 1966 D. N. GLEW 3,231,630
LIQUID FRACTIONATION PROCESS USING GAS HYDRATES
Filed May 7, 1962
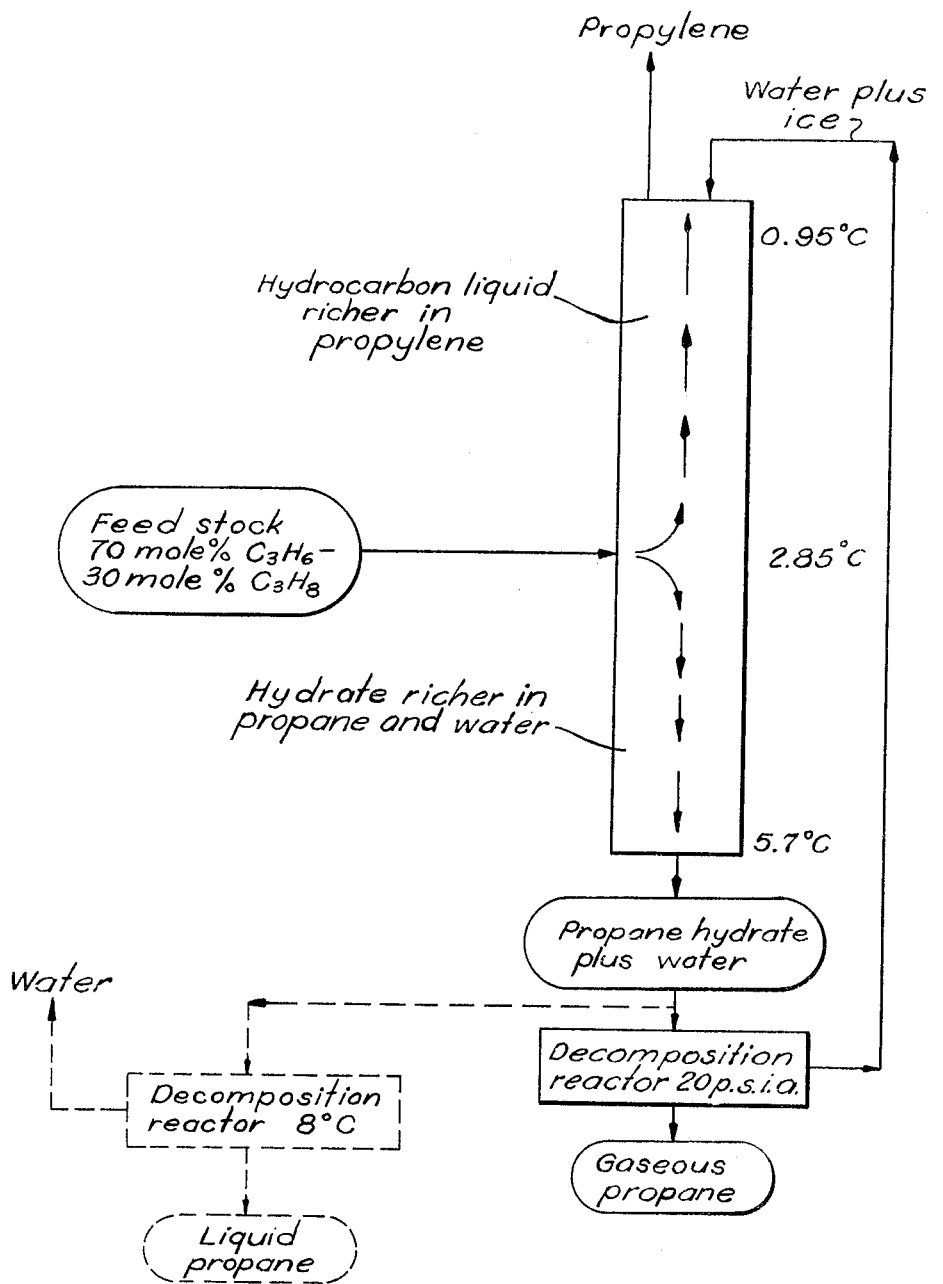
INVENTOR.
David N. Glew
BY
C. Kenneth Bjork
AGENT

United States Patent Office 3,231,630
Patented Jan. 25, 1966

3,231,630
LIQUID FRACTIONATION PROCESS USING
GAS HYDRATES
David N. Glew, Sarnia, Ontario, Canada, assignor to The
Dow Chemical Company, Midland, Mich., a corporation of Delaware
Filed May 7, 1962, Ser. No. 193,355
1 Claim. (Cl. 260—676)

The present process relates to the separation of mixtures and more particularly is concerned with a novel method for separating components of liquid mixtures by formation of solid hydrates therewith.

Mixtures of a wide variety of liquids and particularly organic materials such as propane:propylene, isobutane:isobutylene, methyl fluoride:fluoroform, and the like are difficult and expensive to separate by conventional fractional distillation methods.

Now unexpectedly it has been found that ready fractionation of such hard to separate mixtures, the components of which form solid hydrates, is obtained through formation of a mixed solid hydrate by contacting the liquid mixture with water or aqueous solutions under hydrate forming conditions. In this process, preferentially some components of the mixture form a solid hydrate more readily than others thereby providing ready fractionation of the mixture leaving the resultant liquid enriched in the less readily hydrated component.

In carrying out the instant process, for example, a liquid binary mixture to be fractionated is contacted with water or an aqueous solution at a temperature below the hydrate critical temperature of the least stable hydrate former in the mixture and at a minimum pressure equal to the saturation pressure of the liquid system thereby to form a mixed hydrate. The resulting hydrate is maintained at a temperature ranging between the hydrate critical temperature of the most stable hydrate former in the mixture and the hydrate critical temperature of the least stable hydrate former in the mixture while maintaining a minimum pressure equal to the saturation pressure of the liquid system whereupon there results a liquid organic phase enriched in the less stable hydrate former and a solid hydrate phase enriched in the more stable hydrate. The solid hydrate is separated from the liquid phase. Conveniently, this hydrate in turn is decomposed and organic liquid enriched in the more stable hydrate former thereby recovered.

If temperatures higher than the hydrate critical temperature of the most stable component are employed, no hydrate formation occurs and thus no fractionation takes place. At decomposition temperatures lower than the hydrate critical temperature of the least stable hydrate former component in the mixture, the liquid phase remains completely hydrated thereby providing no fractionation.

The term hydrate critical temperature as used herein means the maximum temperature at which a given hydrate former can exist as a solid hydrate. Above this temperature the solid hydrate decomposes into the hydrate former and water.

The liquid mixture saturation pressure is the minimum reaction pressure that can be employed in the instant process. At pressures below this value liquid: solid extraction is not maintained since no hydrate former liquid phase exists. The maximum pressure to be employed is not critical or limiting as the process proceeds satisfactorily at pressures higher than the mixture saturation pressure. In general, however, extremely high pressures are undesirable from the standpoint of equipment and operating costs.

The actual operating temperatures and pressures to be employed for fractionation of a given system are specific for each hydrate forming pair of compounds under consideration as will be apparent to one skilled in the art. In general, however, temperatures greater than about 30° C. or lower than about minus 20° C. will not be employed in the present process.

The process itself is carried out in readily available high pressure reactors in a batch-type operation, in an integrated cyclic system, or preferably in a continuous system wherein a continuous equilibrium of a given liquid mixture with its solid gas hydrate is maintained. This latter embodiment readily is carried out employing a counter-current equilibrium of liquid hydrocarbon: solid hydrate:liquid water or aqueous solution at a fixed pressure as illustrated schematically in the figure.

Generally, in the illustrated process, a liquid binary mixture, such as propylene and propane for example, is fed into a reactor simultaneously with ice or water. The reaction conditions are maintained so that there is a continuous equilibration of the liquid hydrocarbon mixture with the solid gas hydrate and water. The liquid hydrocarbon phase being continually enriched in propylene moves up the column and the solid hydrate phase, being continuously enriched in propane moves down the column. At any given point, liquid hydrocarbon reacts with solid hydrate and water, or at the top of the column with ice and water to form a corresponding hydrate with the heat of reaction being absorbed by melting of the ice or hydrate material. The resulting hydrocarbon liquid produced is richer in propylene and the hydrate is richer in propane. At this process continues, the liquid hydrocarbon phase becomes increasingly richer in propylene until at the top of the column propylene, substantially free from propane, exits from the reactor. Correspondingly propane hydrate, substantially free from propylene exits from the bottom of the reactor.

Liquid water or ice usually is employed in the present hydrating process. However, the water can be present in the system as an aqueous solution wherein the solute is a non hydrate former rather than as water alone. The use of aqueous solutions such as ethylene glycol, calcium chloride, sodium chloride and the like, for example, provides a means of depressing the freezing point, i.e. lowering the temperature at which undesirable ice forms, of the aqueous liquid phase present in the system thereby extending the useful operating range of the system. With such aqueous solutions, both the critical hydrate temperature of the least stable hydrate former and the more stable hydrate forming components are shifted downward to correspondingly lower temperatures.

Ordinarily, this process is employed on difficultly separable binary mixtures, as exemplified hereinbefore. However, fractionation of multicomponent systems also can be achieved by the novel process disclosed herein.

The following examples will serve to further illustrate the present invention, but are not meant to limit it thereto.

*Example 1*

A 50–50 mole percent propylene:propane liquid mixture under its vapor pressure, i.e., normal saturation pressure, of about 80 pounds per square inch absolute was confined at a temperature of about minus 0.30° C. in a stirred pressure reactor. Ice slowly formed in the system followed by formation of a solid mixed propane-propylene hydrate during which formation the pressure within the reactor decreased to about 55 pounds per square inch absolute. (The critical hydrate temperature for propylene is about 0.95° C. and for propane is about 5.7° C.)

Following substantially complete conversion of the liquid organic mixture into the solid hydrate phase, the temperature of the reactor was increased to about 3.5° C., whereupon the internal pressure in the reactor increased to about 89 pounds per square inch absolute and a liquid hydrocarbon layer separated. This liquid was separated from the system and upon analysis was found to have a composition of about 60 mole percent propylene-40 mole percent propane. The residual hydrate was correspondingly enriched in propane.

Example 2

A 70–30 mole percent propylene-propane liquid mixture was added to an excess of finely crushed ice in a pressure reactor at about 0° C. The resulting mixture was agitated at a pressure of about 200 pounds per square inch absolute until substantially all of the liquid hydrocarbon was removed through solid hydrate formation. The resulting solid hydrate-water mixture was heated to about 2.30° C. while still in the pressurized reactor. This produced a liquid hydrocarbon layer containing about 79 mole percent propylene. The residual solid hydrated hydrocarbon phase contained about 59 mole percent propylene thereby showing preferential enrichment of propylene in the liquid phase.

Example 3

A solid propylene-propane gas hydrate having a composition corresponding to formula $$0.7C_3H_6 \cdot 0.3C_3H_8 \cdot 17H_2O$$

was partially melted with stirring at about 2.2° C. and saturation pressure. The resulting hydrocarbon liquid phase contained about 80 mole percent propylene while the residual solid hydrate had a composition corresponding to $0.62C_3H_6 \cdot 0.38C_3H_8 \cdot 17H_2O$.

The hydrocarbon liquid phase and solid hydrate were separated; the liquid was contacted with water at about 1° C. and saturation pressure thereby becoming rehydrated. This solid phase was heated at about 2° C., at the reaction pressure, thereby becoming partially liquified. This liquid hydrocarbon layer analyzed to show a liquid content of about 85 mole percent propylene. The residual solid hydrate had a composition corresponding to $0.7C_3H_6 \cdot 0.3C_3H_8 \cdot 17H_2O$.

In this process, two stages of fractionation increased the propylene content of a propane-propylene liquid mixture from about 70 to about 85 mole percent while the solid hydrate phase had its propane content increased from about 30 to about 38 mole percent.

Example 4

A liquid propylene:propane mixture containing 1.5 mole percent propane was agitated at minus 0.2° C. with excess ice to form the hydrate $$0.985C_3H_6 \cdot 0.015C_3H_8 \cdot 17H_2O$$

Complete formation of the hydrate was indicated by a pressure drop in the system to about 77 p.s.i.a. The solid hydrate was heated to about 1° C. whereupon liquid water was formed from the non-hydrated ice present in the system, and a hydrocarbon liquid layer separated which contained 0.8 mole percent propane. This single hydrate:liquid fractionation of a dilute propane solution dissolved in propylene reduced the propane content to about 50% of it original level.

Example 5

Substantially complete separation of the propylene and propane components of a liquid propylene:propane mixture is carried out utilizing a pressurized column reactor under a continuous equilibration of the liquid hydrocarbon mixture with its solid gas hydrate. In this process, countercurrent equilibration of the liquid hydrocarbon:solid hydrate:liquid water system is carried out as a series of equilibration steps employing a column reactor, one embodiment of which is shown schematically in the figure.

In this process, a pressurized column reactor is maintained at about 100 pounds per square inch absolute. A liquid mixture of 70 mole percent propylene-30 mole percent propane is fed into the reactor, near the midpoint for example, at a temperature of about 2.85° C. employing a feed rate of about 1 weight unit per unit time. Simultaneously, ice and water at about 0° C. is fed into the top of the column at a rate of about 2.5 weight units per unit time, relative to the hydrocarbon feed. In this operation, the liquid hydrocarbon feed, at the feed temperature, meets solid hydrate moving down the column. Upon contact, propylene is released into liquid hydrocarbon layer while the hydrate and water absorbs propane from the hydrocarbon mixture. As the liquid layer moves up the column to the colder temperatures it continually contacts solid hydrate whereby propane is extracted from the mixture and is held as the solid hydrate, thereby continually enriching the hydrocarbon liquid layer in propylene. The process is continued until substantially propane-free propylene exits from the top of the reactor at a temperature just above 0.95° C. the critical hydrate temperature of propylene.

The solid hydrate is continuously moved down the column to higher temperatures, becoming richer in propane, the process being continued until the temperature reaches 5.7° C. at which point the hydrate is substantially pure propane hydrate.

The hydrate is removed from the bottom of the column and the pressure on this product reduced to about 20 pounds per square inch absolute yielding ice and propane gas substantially free from propylene.

The ice conveniently is stripped of any residual propane and returned to the top of the column. The propane gas then can be recompressed to the liquid state for storage.

Alternatively, the propane hydrate can be decomposed in the reactor by heating to about 8° C. thereby producing liquid propane and liquid water. The water can be returned to the reactor. Other means of recovering the propane from the propane hydrate will be apparent to one skilled in the art.

Example 6

An aqueous solution of sodium chloride having a freezing point depression of about 2.17° C. was maintained in equilibrium at about 0.6° C. and at a pressure of about 150 pounds per square inch absolute with a liquid propylene-propane mixture containing about 67 mole percent propylene. With this system, the critical hydrate temperature of propylene hydrate is about −0.93° C. and of propane hydrate is about 3.76° C. Analysis of the resulting products showed the liquid layer contained about 75 mole percent propylene and the propylene depleted hydrate phase had an approximate composition of $$0.58C_3H_6 \cdot 0.42C_3H_8 \cdot 17H_2O$$

The solid hydrate was removed from the system and decomposed to give a liquid hydrocarbon phase containing about 58 mole percent propylene.

In a manner similar to that described for the foregoing examples, methyl fluoride:fluoroform liquid mixtures can be separated at pressures above the system saturation pressure and at temperatures above the hydrate critical temperature of fluoroform and below the hydrate critical temperature of methyl fluoride to give a liquid layer enriched in fluoroform and a solid hydrate phase enriched in methyl fluoride.

Various modifications can be made in the present invention without departing from the spirit or scope thereof for it is understood that I limit myself only as defined in the appended claim.

I claim:

A process for fractionating a binary mixture of liquid propylene and propane which comprises;
(1) providing a binary mixture of liquid propylene and propane,
(2) contacting said mixtures with a member selected from the group consisting of liquid water, ice and aqueous solutions at hydrate forming conditions thereby to form a solid hydrate of said binary mixtures, (3) subjecting said solid hydrate to a temperature ranging from about 0.95° C. to about 5.7° C. at a minimum pressure of about 90 pounds per square inch absolute thereby to partially decompose the solid hydrate and provide a liquid phase enriched in propylene and a solid hydrate phase enriched in propane, and (4) separating said liquid phase and said solid hydrate phase.

References Cited by the Examiner

UNITED STATES PATENTS

| | | | |
|---|---|---|---|
| 2,363,529 | 11/1944 | Hutchinson | 260—676 |
| 2,375,560 | 5/1945 | Hutchinson et al. | 260—676 X |
| 2,399,723 | 5/1946 | Crowther | 260—676 |
| 2,410,583 | 11/1946 | Hutchinson | 260—676 |
| 3,058,832 | 10/1962 | Glew | 260—676 |

FOREIGN PATENTS 610,237   12/1960   Canada.

ALPHONSO D. SULLIVAN, *Primary Examiner.*